(12) United States Patent
Oswald et al.

(10) Patent No.: US 10,988,056 B2
(45) Date of Patent: Apr. 27, 2021

(54) CHILD RESTRAINT HEADREST WITH SIDE-WING MOVER

(71) Applicant: DOREL JUVENILE GROUP, INC., Foxboro, MA (US)

(72) Inventors: Kevin C. Oswald, Columbus, IN (US); Mei-Hui Lin, Nashville, IN (US); Devin J. Coakley, Bellingham, MA (US); Jason H. Johnson, Brownstown, IN (US)

(73) Assignee: DOREL JUVENILE GROUP, INC., Foxboro, MA (US)

( * ) Notice: Subject to any disclaimer, the term of this patent is extended or adjusted under 35 U.S.C. 154(b) by 0 days.

(21) Appl. No.: 16/484,694

(22) PCT Filed: Mar. 23, 2018

(86) PCT No.: PCT/US2018/023925
§ 371 (c)(1),
(2) Date: Aug. 8, 2019

(87) PCT Pub. No.: WO2018/175831
PCT Pub. Date: Sep. 27, 2018

(65) Prior Publication Data
US 2020/0047647 A1 Feb. 13, 2020

Related U.S. Application Data

(60) Provisional application No. 62/475,331, filed on Mar. 23, 2017.

(51) Int. Cl.
*B60N 2/28* (2006.01)

(52) U.S. Cl.
CPC ......... *B60N 2/2851* (2013.01); *B60N 2/2806* (2013.01); *B60N 2/2872* (2013.01)

(58) Field of Classification Search
CPC ... B60N 2/2851; B60N 2/2806; B60N 2/2872
See application file for complete search history.

(56) References Cited

U.S. PATENT DOCUMENTS

| | | | |
|---|---|---|---|
| 6,068,336 A | 5/2000 | Schoenauer | |
| 6,250,716 B1 | 6/2001 | Clough | |
| 6,378,950 B1 | 4/2002 | Takamizu et al. | |
| 6,467,846 B2 | 10/2002 | Clough | |
| 6,478,377 B2 | 11/2002 | Kassai et al. | |
| 6,666,517 B2 | 12/2003 | Clough | |
| 7,040,705 B2 | 5/2006 | Clough | |
| 7,226,124 B2 | 6/2007 | Mori et al. | |
| 7,232,185 B2 | 6/2007 | Hartenstine et al. | |
| 7,264,313 B2 | 9/2007 | Clough | |
| 7,364,239 B2 | 4/2008 | Clough | |
| 7,500,721 B2 | 3/2009 | Beroth et al. | |

(Continued)

FOREIGN PATENT DOCUMENTS

| EP | 2708407 B1 | 7/2014 |
|---|---|---|
| JP | 2010-42209 A | 2/2010 |

OTHER PUBLICATIONS

PCT International Search Report and Written Opinion completed by the ISA/US dated May 18, 2014 and issued in connection with PCT/US2018/023925.

*Primary Examiner* — Anthony D Barfield
(74) *Attorney, Agent, or Firm* — Barnes & Thornburg LLP

(57) ABSTRACT

A juvenile vehicle seat includes a seat bottom and a backrest coupled to the seat bottom. The seat also includes a headrest coupled to the backrest.

20 Claims, 11 Drawing Sheets

(56) References Cited

U.S. PATENT DOCUMENTS

| | | |
|---|---|---|
| 7,631,935 B2 | 12/2009 | Chen et al. |
| 8,109,571 B2 | 2/2012 | Chen |
| 8,113,579 B2 | 2/2012 | Fiore, Jr. et al. |
| 8,136,880 B2 | 3/2012 | Biaud et al. |
| 8,911,018 B2 | 12/2014 | Gaither et al. |
| 8,985,622 B1 | 3/2015 | Cannon |
| 9,028,000 B2 | 5/2015 | Millan |
| 9,085,254 B2 | 7/2015 | Navarro et al. |
| 9,150,130 B2 | 10/2015 | Jackow |
| 9,315,125 B2 | 4/2016 | Long et al. |
| 9,393,892 B1 | 7/2016 | Millan |
| 9,463,725 B2 | 10/2016 | Szczygiel et al. |
| 9,611,041 B2 | 4/2017 | Baker et al. |
| 2007/0246982 A1 | 10/2007 | Nett et al. |
| 2008/0018152 A1 | 1/2008 | Vadai |
| 2014/0077545 A1 | 3/2014 | Neuber et al. |
| 2016/0023767 A1 | 1/2016 | Zheng et al. |
| 2016/0046219 A1 | 2/2016 | Schauf et al. |
| 2017/0021745 A1 | 1/2017 | Oswald et al. |

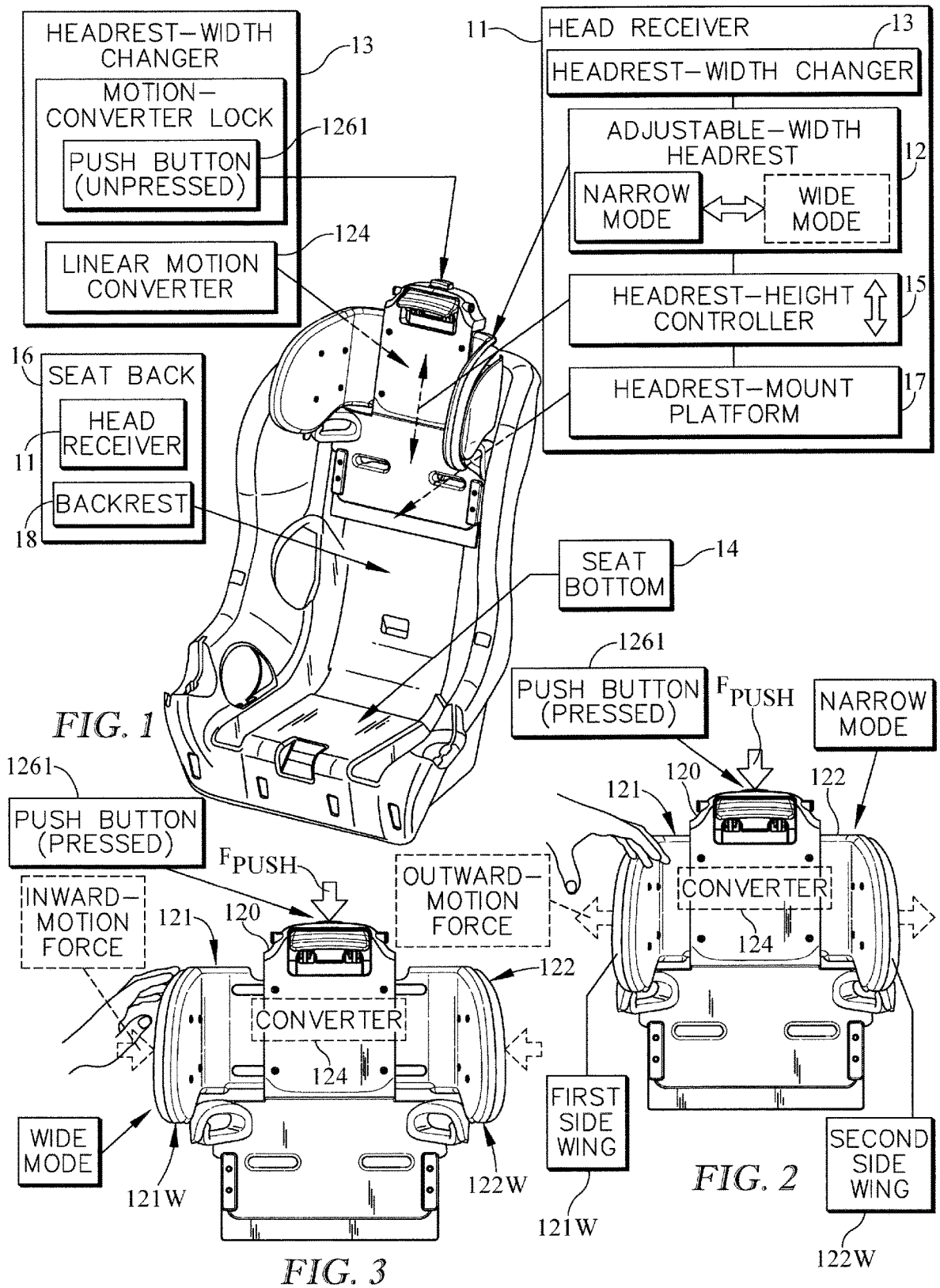

CHILD RESTRAINT HEADREST WITH SIDE-WING MOVER

PRIORITY CLAIM

This application is a national stage application under 35 U.S.C. § 371 of PCT International Application No. PCT/US2018/023925, filed Mar. 23, 2018, which claims the benefit of and priority under 35 U.S.C. § 119(e) to U.S. Provisional Application No. 62/475,331, filed Mar. 23, 2017, the entire disclosures of which are expressly incorporated by reference herein.

BACKGROUND

The present disclosure relates to child restraints and in particular to a juvenile seat provided for use on passenger seat in a vehicle. More particularly, the present disclosure relates to a headrest in a juvenile seat.

SUMMARY

According to the present disclosure, a child restraint includes a headrest. In illustrative embodiments, the child restraint includes a seat bottom and a seat back extending upwardly from the seat bottom and including the headrest.

In illustrative embodiments, the headrest is adjustable so that its width can be changed by a caregiver. The adjustable-width headrest includes a center head support, a first movable head support mounted on one side of the center head support for lateral sliding movement relative to the center head support, and a second movable head support mounted on an opposite side of the center head support for lateral sliding movement relative to the center head support. The first and second movable head supports can be moved relative to one another by a caregiver to change the width of the adjustable-width headrest.

In illustrative embodiments, the child restraint also includes a headrest-width changer that is linked to the adjustable-width headrest. The headrest-width changer includes a linear motion converter that is arranged in accordance with the present disclosure to interconnect the first and second movable head supports of the adjustable-width headrest and convert lateral motion of the first movable head support in a first direction relative to the center head support into lateral motion of the second movable head support in an opposite second direction relative to the center head support. A caregiver can change the width of the headrest easily using the linear motion converter by manually gripping and moving one of the movable head supports in one direction relative to the center head support to cause the other of the movable head supports to move in an opposite direction at the same time.

In illustrative embodiments, the first movable head support includes a first side-wing mount coupled at an inboard end to the center head support for lateral sliding movement relative to the center head support and a first side wing coupled to an opposite outboard end of the first side-wing mount for movement therewith relative to the center head support. The second movable head support includes a second side-wing mount coupled at an inboard end to the center head support for lateral sliding movement relative to the center head support and a second side wing coupled to an opposite outboard end of the second side-wing mount for movement therewith relative to the center head support. The first and second side wings are arranged to lie in spaced-apart and opposed relation to one another to define a head-receiving space therebetween to receive the head of a child seated on the seat bottom.

In illustrative embodiments, the lateral spacing between these first and second side wings changes in accordance with the present disclosure in response to movement of the first and second movable head supports relative to one another so that a caregiver can manually change the adjustable-width headrest from a NARROW mode to a WIDE mode and vice-versa to change the lateral width of the head-receiving space provided between the first and second side wings. It is within the scope of this disclosure to establish one or more predetermined discrete positions of the first and second movable head supports to establish additional lateral-spacing modes of the adjustable-width headrest between the NARROW and WIDE modes.

In illustrative embodiments, the linear motion converter is configured and used in accordance with the present disclosure to convert linear motion of one of the side wings automatically into linear motion of the other of the side wings so that the first and second movable head supports can be moved toward one another to narrow the width of the adjustable-width headrest to establish the NARROW mode of the adjustable headrest or away from one another to widen the width of the adjustable-width headrest to establish the WIDE mode of the adjustable-width headrest. In use, the width of the adjustable-width headrest is changed in the field in response to manual movement of one of the movable head supports by a caregiver relative to the center head support.

In illustrative embodiments, the linear motion converter comprises a first rack strip cantilevered to the first movable head support and arranged to extend toward the second movable head support and a second rack strip cantilevered to the second movable head support and arranged to extend away from the second movable head support. The second rack strip is arranged to lie in spaced-apart parallel relation to the first rack strip to define a gear-receiving space therebetween. The linear motion converter also includes a motion-transfer gear that is arranged to extend into the gear-receiving space to engage and mesh with teeth included in each of the first and second rack strips. The motion-transfer gear rotates about an axis of rotation to convert linear motion of one of the rack strips into linear motion of the other of the rack strips so that movement of one of the movable head supports relative to the center head support results in movement of the other of the head supports relative to the center head support to widen or narrow the adjustable-width headrest.

In illustrative embodiments, the headrest-width changer also includes a motion-converter lock that interacts with the motion-transfer gear of the linear motion converter and can be used by the caregiver to block any mode change of the adjustable-width headrest between the NARROW and WIDE modes. The motion-converter lock is mounted on the center head support for up-and-down movement between a locked position in which rotation of the motion-transfer gear about its axis of rotation is blocked so that the adjustable-width headrest cannot be widened or narrowed and an unlocked position in which the motion-transfer gear is free to rotate about its axis of rotation to allow a caregiver to widen or narrow the adjustable-width headrest by moving one of the movable head supports relative to the center head support.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a child restraint including a head receiver in accordance with the present disclosure, a seat bottom, and a seat back, and showing that the seat back comprises a backrest arranged to extend upwardly from the seat bottom and the a head receiver, and the head receiver is configured to include an adjustable-width headrest that is mounted for up-and-down movement on the backrest and that is coupled to a headrest-width changer that comprises a linear motion converter and a motion-converter lock that can be operated by a caregiver as suggested in FIGS. 2 and 3 to allow the caregiver to change the adjustable-width headrest manually from a NARROW mode shown in FIG. 2 to a WIDE mode shown in FIG. 3;

FIG. 2 is a front elevation view of the head receiver of FIG. 1 showing that first and second side wings included in the adjustable-width headrest are arranged to lie a first distance apart to establish a small head-receiving space associated with the NARROW mode of the adjustable-width headrest and suggesting that a caregiver can unlock the adjustable-width headrest by applying a downward push force to a spring-biased push button included in the motion-converter lock of the headrest-width changer and then pulling outwardly on the first side wing to move the first side wing to the left to activate the linear motion converter to cause the second side wing to move simultaneously to the right and away from the first side wing to widen the adjustable-width headrest;

FIG. 3 is a view similar to FIG. 2 showing that the first and second side wings included in the adjustable-width headrest are arranged to lie a relatively greater second distance apart (as compared to FIG. 2) to establish a relatively larger head-receiving space associated with the WIDE mode of the adjustable-width headrest and suggesting that the caregiver can unlock the adjustable-width headrest by applying a downward push force to a spring-biased push button including in the motion-converter lock of the headrest-width changer and then pushing inwardly on the first side wing to move the first side wing to the right to activate the linear motion converter to cause the second side wing to move simultaneously to the right and toward the first side wing to narrow the adjustable-width headrest;

DETAILED DESCRIPTION

Figure 4:
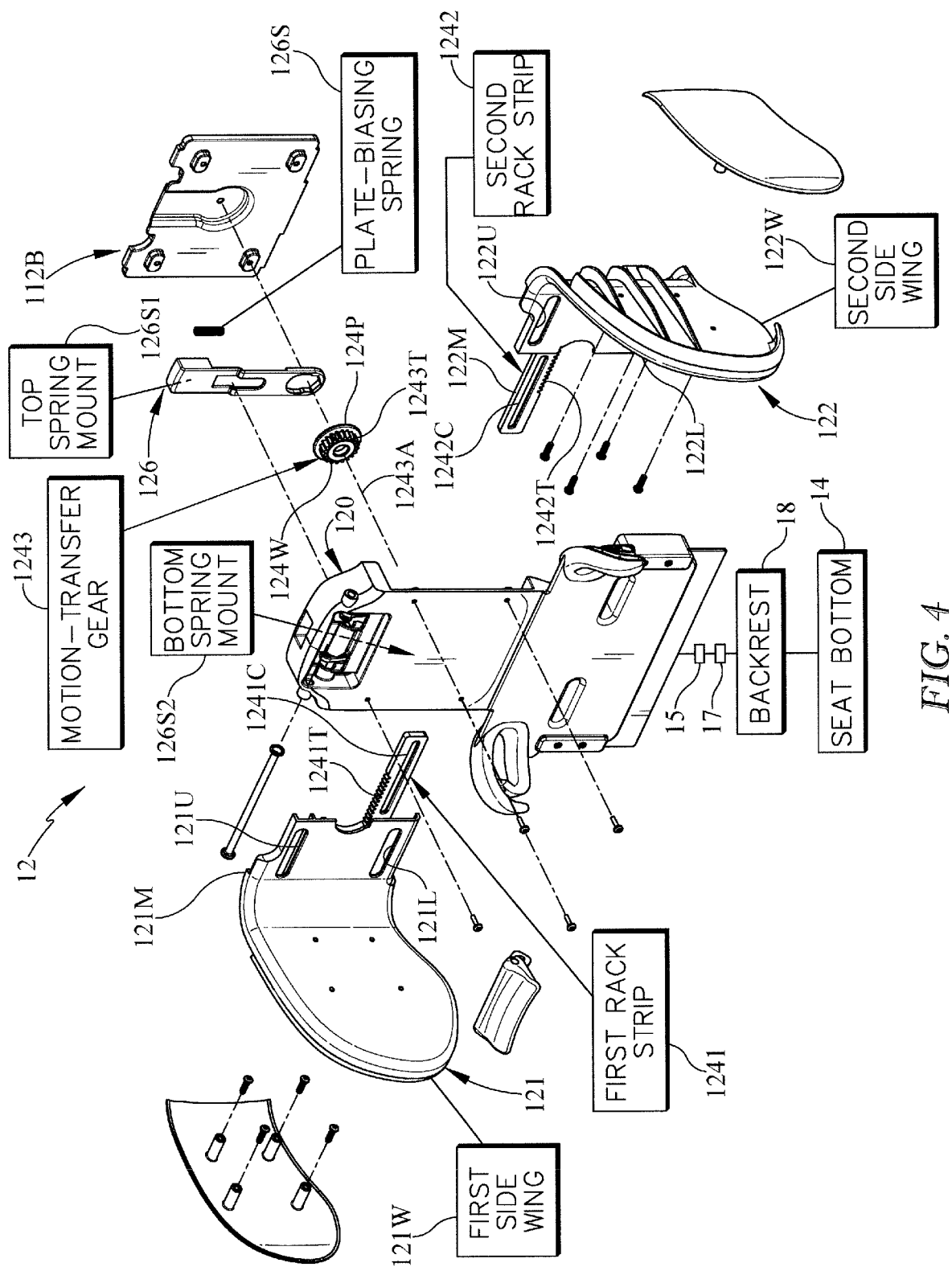
FIG. 4 is an exploded front perspective assembly view of components included in the adjustable-width headrest and the headrest-width changer shown in FIGS. 1-3 (some of these same components are shown in an exploded rear perspective assembly view in FIG. 11)

An illustrative child restraint 10 includes an adjustable-width headrest 12 that can be widened or narrowed manually in the field by a caregiver to change the size of a head-receiving space 12S formed in the adjustable-width headrest 12. A NARROW mode of the adjustable-width headrest 12 is shown, for example, in FIGS. 1, 2, and 5A and a WIDE mode of the adjustable-width headrest 12 is shown, for example, in FIGS. 3 and 5B.

Child restraint 10 includes a seat bottom 14 and a seat back 16 arranged to extend upwardly from seat bottom 14 as suggested illustratively in FIG. 1. Seat back 16 comprises a backrest 18 that is coupled to seat bottom 14 and a head receiver 11 that includes the adjustable-width headrest 12 as suggested in FIG. 1. In illustrative embodiments, backrest 18 is mounted to remain in a stationary position relative to seat bottom 14 and the adjustable-width headrest 12 is mounted for up-and-down movement on backrest 18 using a headrest-height controller 15 also included in head receiver 11 to change the height of headrest 12 relative to seat bottom 14. Headrest 12 can be widened or narrowed in accordance with the present disclosure regardless of its elevation above seat bottom 14.

Head receiver 11 comprises an adjustable-width headrest 12, a headrest-width changer 13, a headrest-height controller 15, and a headrest-mount platform 17 as suggested diagrammatically in FIG. 1. In illustrative embodiments, headrest-mount platform 17 is coupled to backrest 18 and any suitable headrest-height controller 15 is linked to headrest-mount platform 17 and to the adjustable-width headrest 12 and configured to provide means controlled by a caregiver for moving the adjustable-width headrest 12 up and down on backrest 18 to establish a selected elevation of the adjustable-width headrest 12 relative to the underlying seat bottom 14.

In use, a caregiver uses headrest-height controller 15 to move the adjustable-width headrest 12 to a proper elevation position on backrest 14. Then, the caregiver uses headrest-width changer 13 to change the width of the adjustable-width headrest 12 between the NARROW mode shown in FIGS. 1 and 2 and the WIDE mode shown in FIG. 3.

Figure 5A:
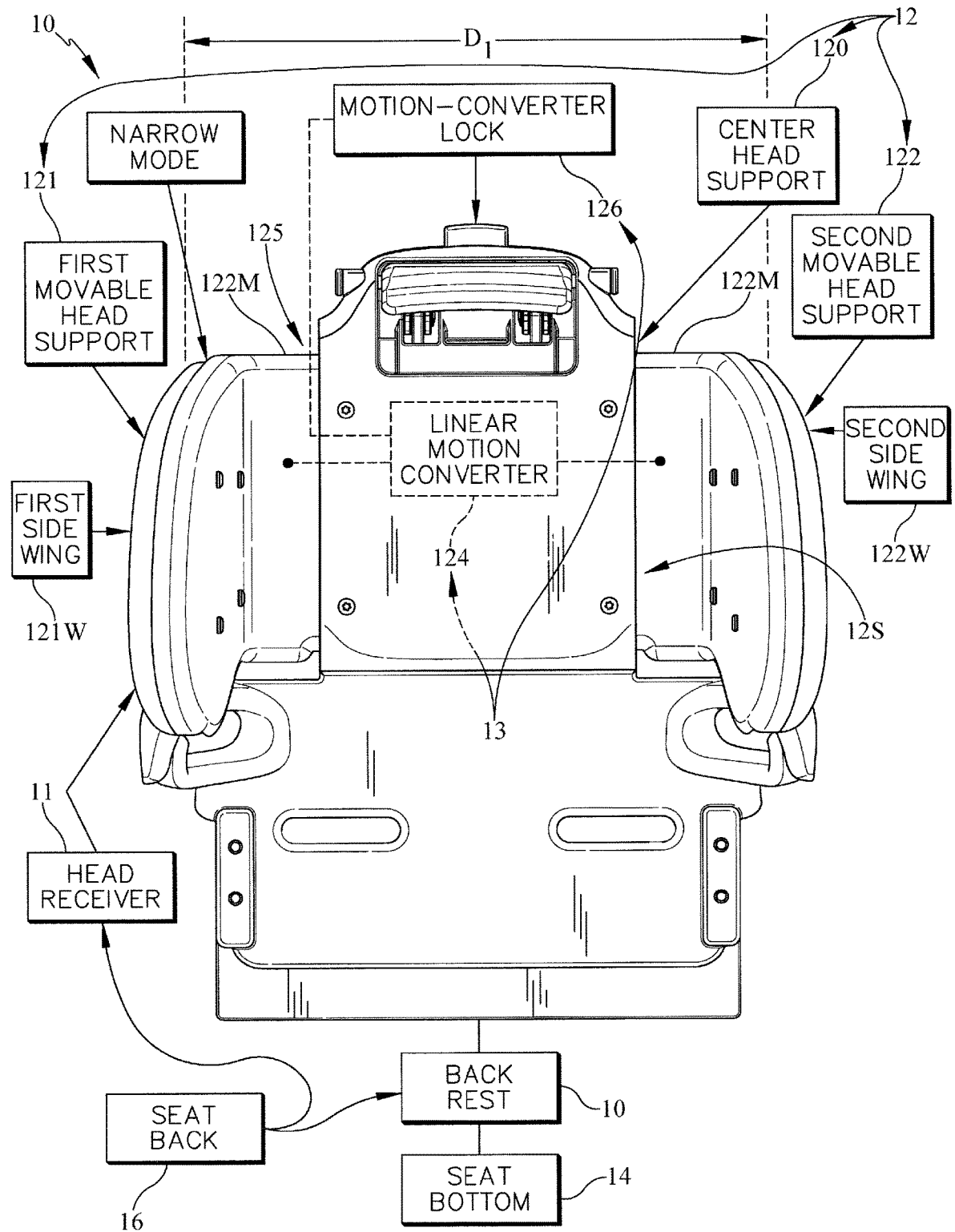
FIG. 5A is a diagrammatic view of a child restraint in accordance with the present disclosure and includes an illustrative front-elevation view of an adjustable-width headrest included in the child restraint and a diagrammatic view of a headrest-width changer included in the child restraint and suggests that the adjustable-width headrest includes a first movable head support having a first side wing, a second movable head support having a second side wing, and a center head support located between the first and second movable head supports, and also suggests that the headrest-width changer includes a linear motion converter coupled to the first and second movable head supports and configured to convert linear motion of one of the movable head supports into opposite linear motion of the other of the movable head supports under the control of a caregiver and a motion-converter lock for locking and unlocking the linear motion converter.
Figure 11:
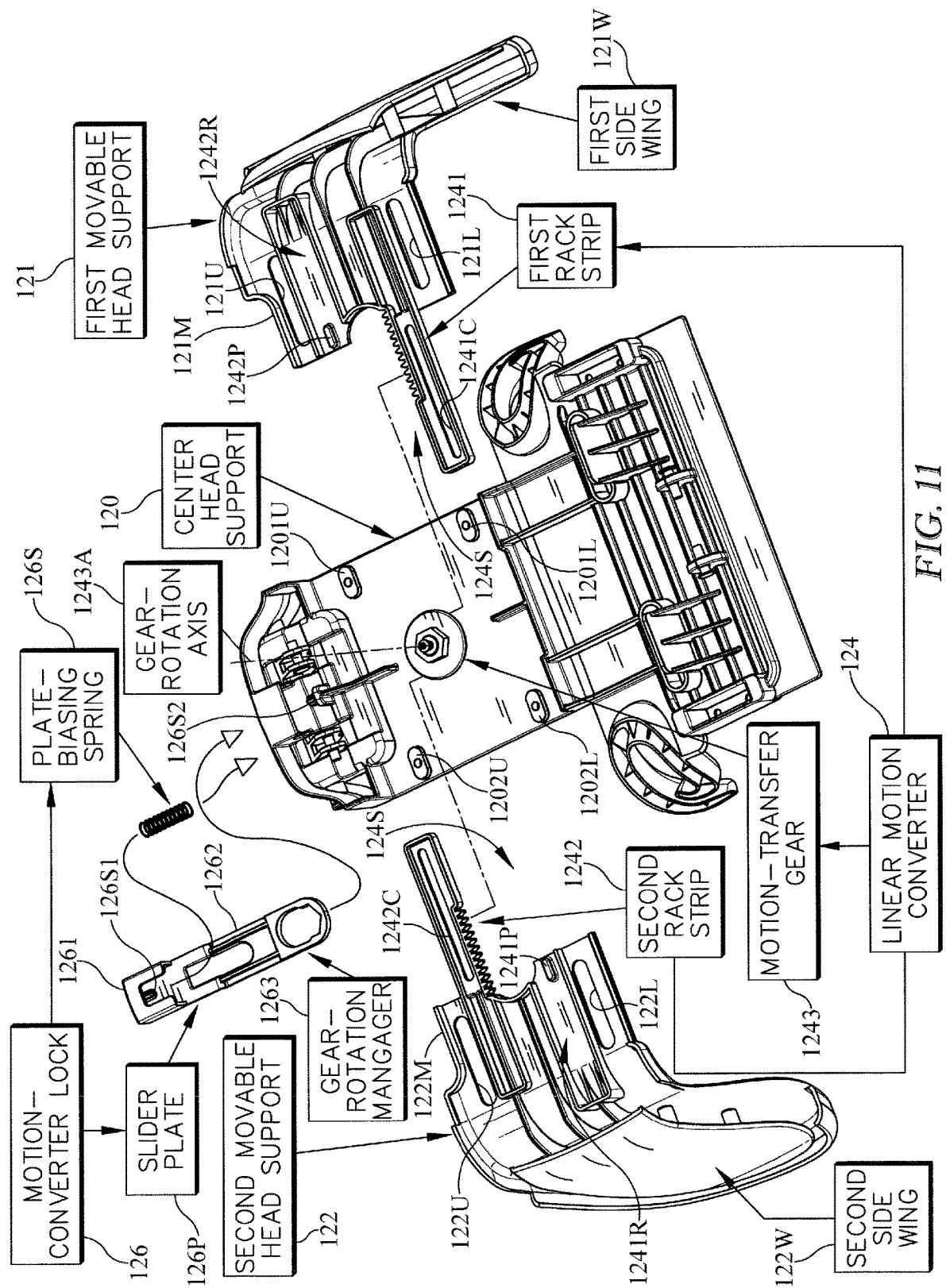
FIG. 11 is an exploded perspective view of several components included in the head receiver and showing that the linear motion converter includes first and second rack strips and a motion-transfer gear and suggesting that the rack teeth on the first rack strip and the rack teeth on the second rack strip will engage the gear teeth on the motion-transfer gear and showing that the motion-converter lock includes a plate-biasing spring and a slider plate comprising, in series, a caregiver push button, a button-support strip, and a gear-rotation manager coupled to the button-support strip.

Adjustable-width headrest 12 includes a center head support 120, first and second movable head supports 121, 122, a linear motion converter 124 coupled to first and second movable head supports 121, 122, and a motion-converter lock 126 as suggested in FIGS. 4, 5A, and 11. First and second movable head supports 121, 122 are mounted for lateral movement relative to one another and to center head support 120 to allow a caregiver to move head supports 121, 122 toward one another to establish the NARROW mode of adjustable-width headrest 12 as suggested in FIGS. 1 and 2 and, alternatively, away from one another to establish the WIDE mode of adjustable-width headrest 12 as suggested in FIGS. 3 and 5B. It is within the scope of this disclosure to establish one or more predetermined positions of movable head supports 121, 122 between the positions associated with the NARROW and WIDE modes of adjustable-width headrest.

Headrest 12 is adjustable in width in accordance with the present disclosure as suggested in FIGS. 2 and 3. Adjustable-width headrest 12 includes a center head support 120 mounted in any suitable manner for up-and-down movement on backrest 18, a first movable head support 121 mounted on one side of center head support 120 for lateral sliding movement relative to center head support 120, and a second movable head support 122 mounted on an opposite side of center head support 120 for lateral sliding movement relative to center head support 120.

Figure 7:
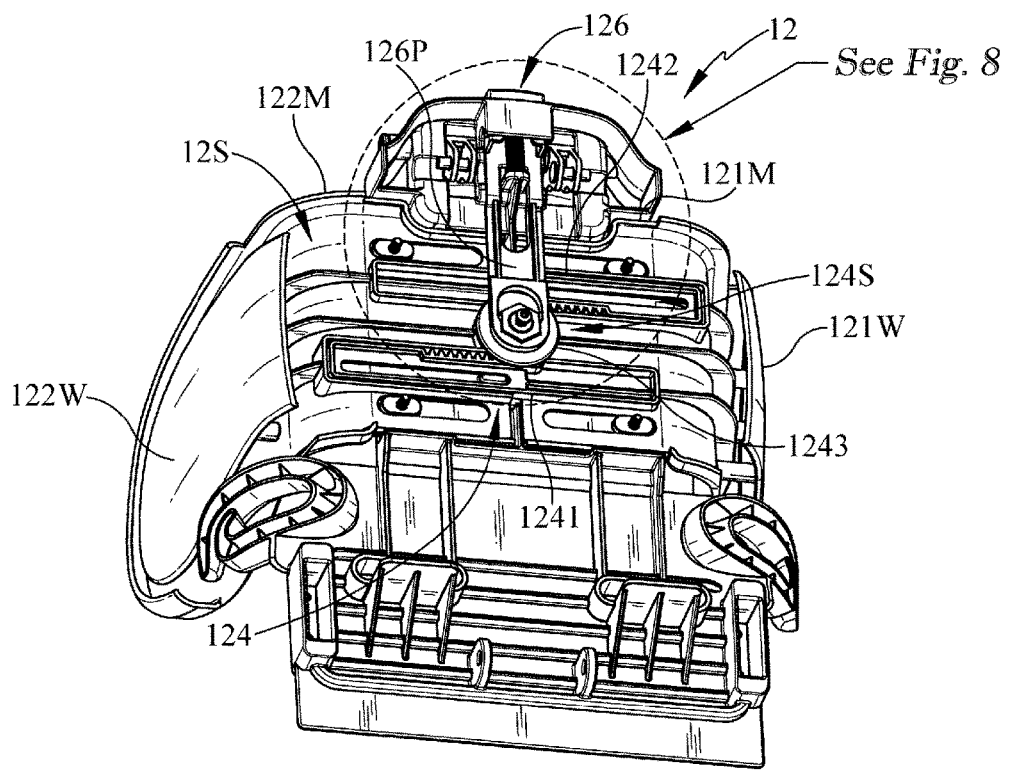
FIG. 7 is a rear perspective view of the adjustable-width headrest and the headrest-width changer of FIG. 5A with a rear cover panel removed to show that the linear motion converter includes a first rack strip cantilevered to the first movable head support, a second rack strip cantilevered to the second movable head support, and a motion-transfer gear supported for rotation and engaged to each of the first and second rack strips and suggesting that the slider plate of the motion-converter lock of FIG. 6 is mounted for up-and-down sliding movement on the center head support from an outwardly projected locked position shown in FIGS. 7 and 8 in which the motion-transfer gear is blocked from rotation about its axis of rotation to an inwardly retracted unlocked position shown in FIGS. 9 and 10 in which the motion-transfer gear is free to rotate about its axis of rotation.
Figure 9:
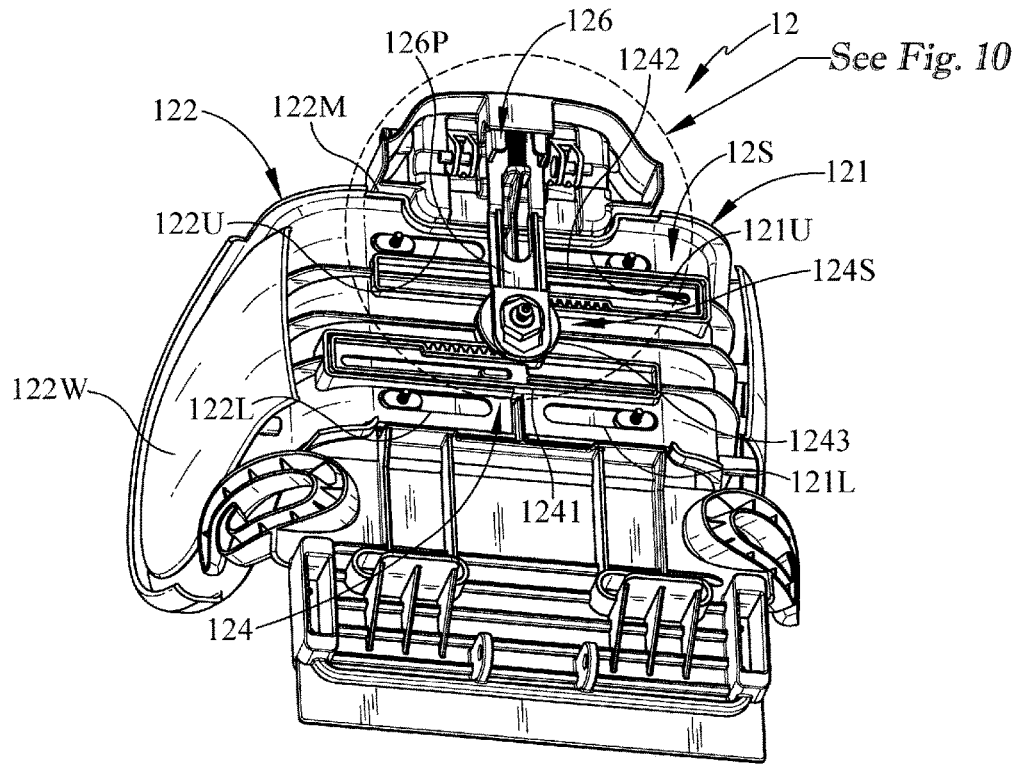
FIG. 9 is a rear perspective view similar to FIG. 7 showing that the motion-transfer gear is UNLOCKED in response to downward movement of the slider plate relative to the center head support from the locked position shown in FIGS. 7 and 8 to assume an unlocked position thereby freeing the motion-transfer gear to rotate about its axis of rotation so as to convert linear motion of one of the movable head supports in one direction into linear motion of the other of the movable head supports in an opposite direction so that a caregiver can manually change the adjustable-width headrest from the WIDE mode shown in FIG. 6 to the NARROW mode shown in FIG. 1.
Figure 13:
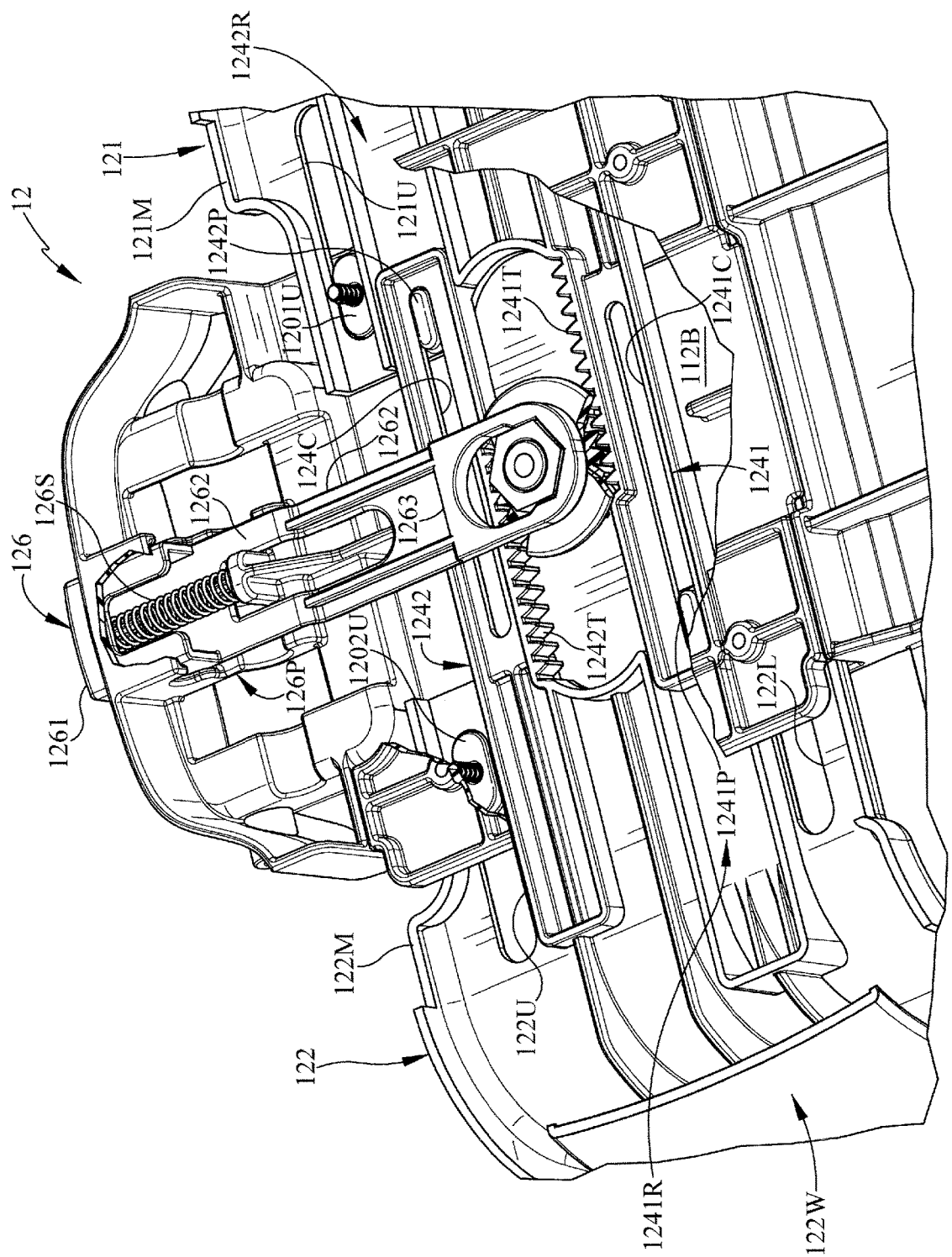
FIG. 13 is an enlarged rear perspective view of a portion of the adjustable-width headrest similar to FIG. 12 with the rear cover panel installed but with portions of that rear cover panel broken away and portions of other components broken away to show engagement of gear teeth and rack teeth in each of the first and second rack strips.

Headrest-width changer 13 includes a linear motion converter 124 that is arranged to interconnect the first and second movable head supports 120, 122 as suggested in FIGS. 7, 9, and 13 and convert lateral motion of the first movable head support 121 in a first direction relative to center head support 120 into lateral motion of the second movable head support 122 in an opposite second direction relative to center head support 120 as suggested in FIGS. 2 and 3. Linear-motion converter 124 is arranged to lie in a space provided between backrest 18 and center head support 120 in illustrative embodiments of the present disclosure. A caregiver can change the width of the adjustable-width headrest 12 easily using linear motion converter 124 while linear motion converter 124 is unlocked by manually moving one of the movable head supports 121, 122 in one direction relative to center head support 120 to cause the other of the movable head supports 121, 122 to move in an opposite direction at the same time.

Figure 5B:
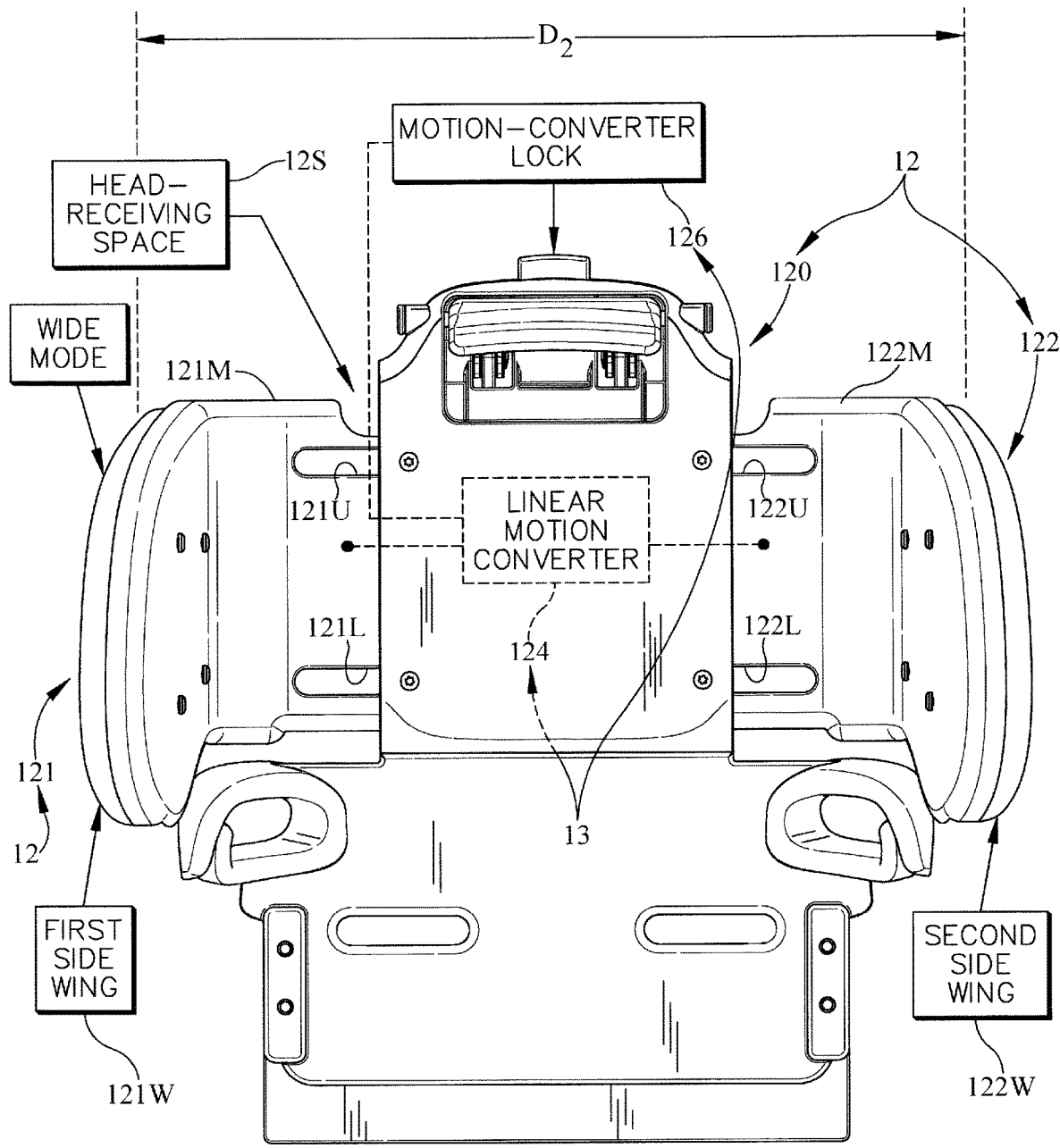
FIG. 5B is a perspective view of the adjustable-width headrest and the headrest-width changer of FIG. 5A following lateral movement of the first and second movable head supports away from one another and relative to the center head support from a NARROW mode shown in FIGS. 1, 2, and 5A to a WIDE mode shown in FIGS. 2 and 5B so as to widen a head-receiving space that is defined between the first side wing of the first movable head support and the second side wing of the second movable head support.

In illustrative embodiments, first movable head support 121 of the adjustable-width headrest 12 includes a first side-wing mount 121M coupled at an inboard end to center head support 120 for lateral sliding movement relative to center head support 120 and a first side wing 121W coupled to an opposite outboard end of first side-wing mount 121M for movement therewith relative to center head support 120 as suggested in FIGS. 5B and 11. Second movable head support 122 of the adjustable-width headrest 12 includes a second side-wing mount 122M coupled at an inboard end to center head support 120 for lateral sliding movement relative to center head support 120 and a second side wing 122W coupled to an opposite outboard end of second side-wing mount 122M for movements relative to center head support 120 as also suggested in FIGS. 5B and 11. First and second side wings 121W, 122W are arranged to lie in spaced-apart and opposed relation to one another to define a head-receiving space 12S therebetween to receive the head of a child seated on seat bottom 14 as suggested in FIGS. 5A and 5B. In accordance with the present disclosure, the lateral spacing between these side wings 121W, 122W changes in response to movement of the movable head supports 121, 122 relative to one another so that a caregiver can manually change adjustable headrest 12 from a NARROW mode to a WIDE mode and vice-versa as suggested in FIGS. 5A and 5B.

Figure 8:
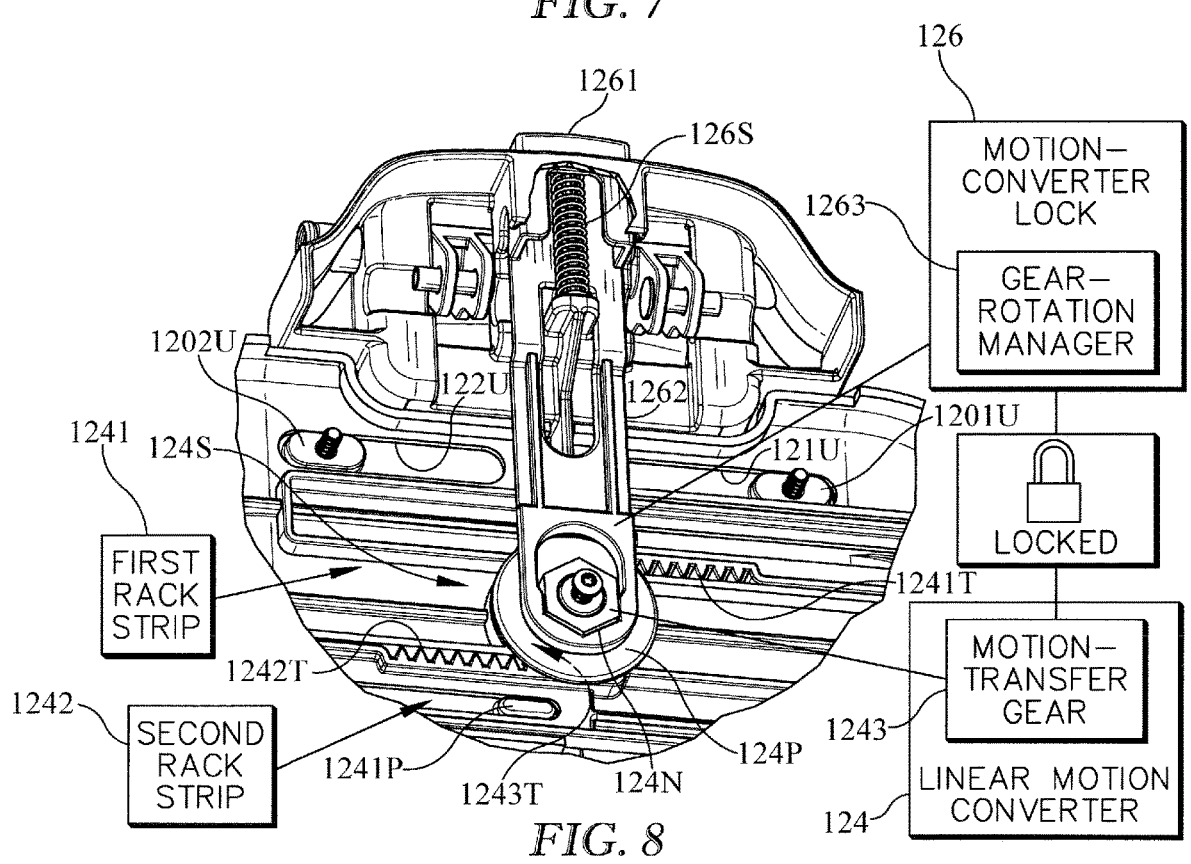
FIG. 8 is an enlarged perspective view of a portion of the adjustable-width headrest taken from the circled region of FIG. 7 showing that the motion-transfer gear is LOCKED and therefore blocked from rotation about is axis of rotation so that relative movement of the first and second rack strips is also blocked owing to engagement of gear teeth in the non-rotatable motion-transfer gear with rack teeth included in each of the first and second rack strips and therefore there is no relative movement allowed between the first and second movable head supports.
Figure 10:
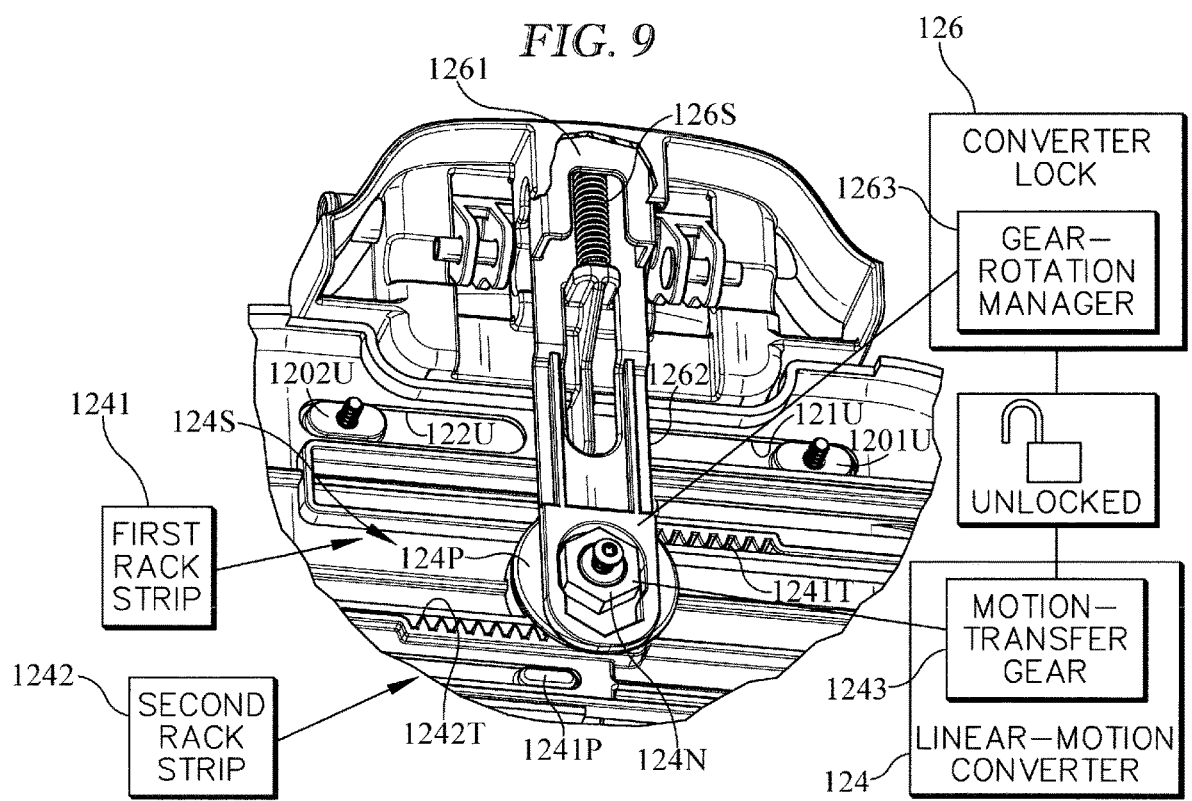
FIG. 10 is an enlarged perspective view of a portion of the adjustable-width headrest taken from the circled region of FIG. 9 showing that the motion-transfer gear is UNLOCKED and thus free to rotate about its axis of rotation so that linear motion of the first rack strip in a first direction is converted into linear motion of the second rack strip in an opposite direction (or vice versa) in response to engagement of rack teeth included in each of the rack strips with gear teeth included in the rotatable motion-transfer gear while one of the rack strips is moved by a caregiver relative to the backrest.

Linear motion converter 124 of headrest-width changer 13 is configured and used in accordance with the present disclosure to convert linear motion of one of the side wings 121W, 122W automatically into linear motion of the other of the side wings 121W, 122W so that first and second movable head supports 121, 122 can be moved toward one another to narrow the width of adjustable-width headrest 12 to establish the NARROW mode of adjustable-width headrest 12 or away from one another to widen the width of adjustable-width headrest 12 to establish the WIDE mode of adjustable-width headrest 12 in response to manual movement of one of the movable head supports 121, 122 by a caregiver relative to center head support 120 as suggested in FIGS. 5A, 5B, 9, and 13. Linear motion converter 124 comprises a first rack strip 1241 cantilevered to first side-wing mount 121M of first movable head support 121 and arranged to extend toward second movable head support 122 and a second rack strip 1242 cantilevered to second side-wing mount 122M and arranged to extend away from the second side-wing mount 122M and lie in spaced-apart parallel relation to first rack strip 1241 to define a gear-receiving space 124S therebetween as suggested in FIGS. 7, 9, 11, and 13. Linear motion converter 124 also includes a motion-transfer gear 1243 that is arranged to extend into the gear-receiving space 124S to engage and mesh with teeth included in each of the first and second rack strips 1241, 1242 as suggested in FIGS. 8, 10, and 11. The motion-transfer gear 1243 rotates about an axis of rotation 1243A shown in FIG. 4 to convert linear motion of one of the rack strips 1241, 1242 into opposite linear motion of the other of the rack strips 1241, 1242 so that movement of one of the movable head supports 121, 122 relative to center head support 120 in one direction results in movement of the other of the head supports 121, 122 relative to center head support 120 in an opposite direction while linear motion converter 124 is unlocked to widen or narrow adjustable-width headrest 112.

Headrest-width changer 13 also includes a motion-converter lock 126 that can be used by the caregiver to block any mode change of adjustable-width headrest 12 between the NARROW and WIDE modes. Motion-converter lock 126 is mounted on center head support 120 for movement between a locked position shown in FIGS. 7, 8, and 13 in which rotation of motion-transfer gear 1243 about its axis of rotation 1243A is blocked so that adjustable-width headrest 12 cannot be widened or narrowed and an unlocked position shown in FIGS. 6 and 10 in which motion-transfer gear 1243 is free to rotate about its axis of rotation 1243A to allow a caregiver to widen or narrow the adjustable-width headrest 12 by moving one of the movable head supports 121, 122 relative to center head support 120.

Figure 12:
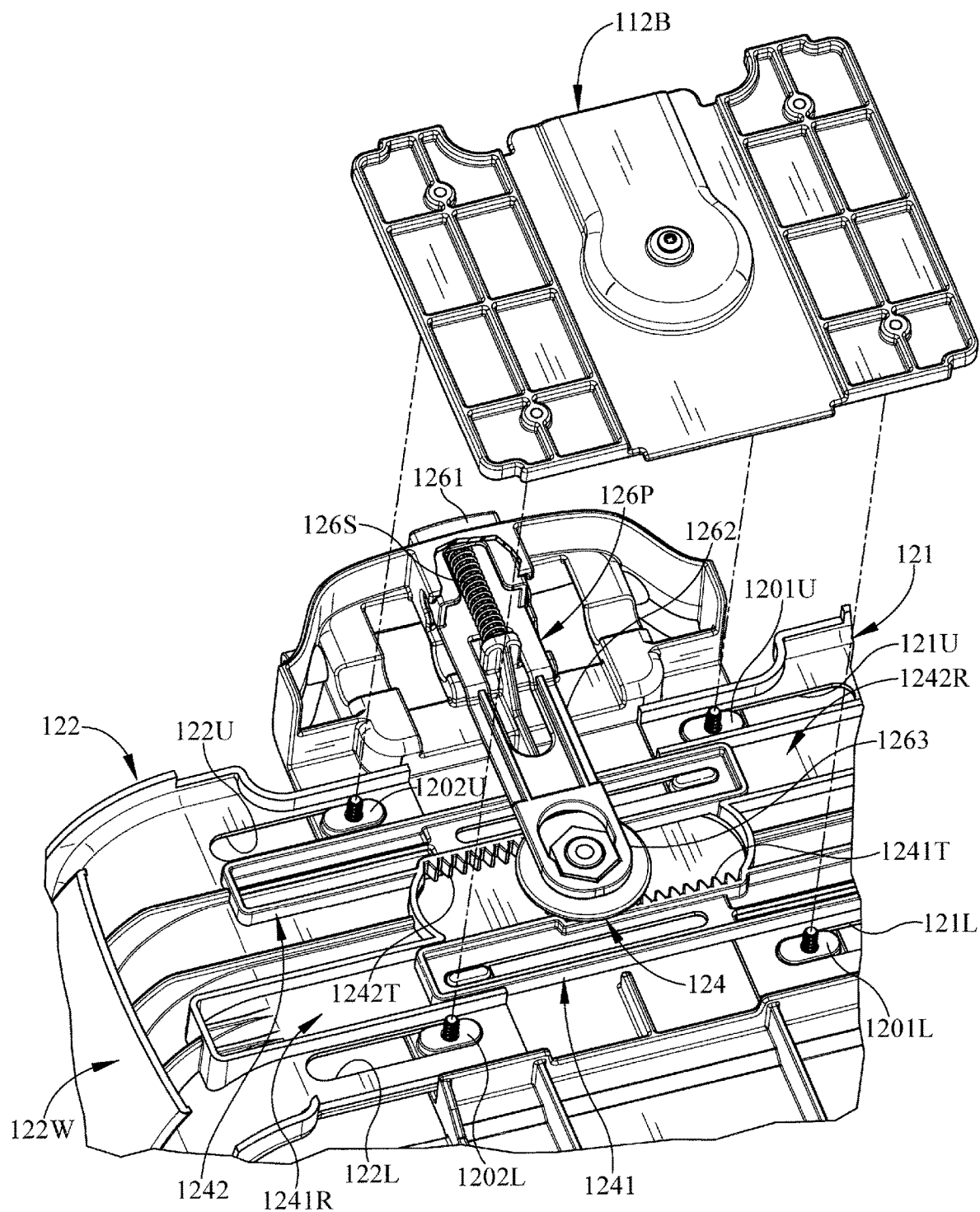
FIG. 12 is an enlarged rear perspective view of the adjustable-width headrest and the headrest-width changer before a rear cover panel is installed.

First movable head support 121 of adjustable-width headrest 12 is mounted for sliding movement on center head support 120 between a retracted position associated with the NARROW mode of adjustable-width headrest 12 as shown in FIG. 5A and an extended position associated with the WIDE mode of adjustable-width headrest 12 as shown in FIG. 5B. First side-wing mount 121M of first movable head support 121 is formed to include upper and lower guide slots 121U, 121L as shown in FIGS. 4, 5B, and 11. Upper and lower first guide pins 1201U, 1201L are included in center head support 120 as suggested in FIGS. 11 and 13. Upper first guide pin 1201U extends into upper guide slot 121U and lower first guide pin 1201L extends into lower guide slot 121L as suggested in FIG. 12 to control sliding movement of first movable head support 121 relative to center head support 120 between the retracted and extended positions.

Second movable head support 122 of adjustable-width headrest 12 is mounted for sliding movement on center head support 120 between a retracted position associated with the NARROW mode of adjustable-width headrest 12 as shown in FIGS. 2 and 5A and an extended position associated with the WIDE mode of adjustable-width headrest 12 as shown in FIGS. 3 and 5B. Second side-wing mount 12M of second movable head support 122 is formed to include upper and lower guide slots 122U, 122L as shown in FIGS. 4, 5B, and 11. Upper and lower second guide pins 1202U, 1202L are included in center head support 120 as suggested in FIGS. 11 and 13. Upper second guide pin 1202U extends into upper guide slot 122U and lower second guide pin 1202L extends into lower guide slot 122L as suggested in FIG. 12 to control sliding movement of second movable head support 122 relative to center head support 120 between the retracted and extended positions.

First rack strip 1241 of linear motion converter 124 is formed to include an elongated channel 1241C that receives a guide post 1241P coupled to second side-wing mount 122M to control sliding movement of the first rack strip 1241 relative to the second movable head support 122, as suggested in FIG. 11 and shown in FIG. 13. First rack strip 1241 also includes a set of downwardly extending rack teeth 1241T that mesh with gear teeth 1243T included in motion-transfer gear 1243 as suggested in FIGS. 4 and 13. First rack strip 1241 is arranged to extend into and slide back and forth in a first strip-receiver channel 1241R formed in second side-wing mount 122M as suggested in FIGS. 11 and 13.

Second rack strip 1242 of linear motion converter 124 is formed to include an elongated channel 1242C that receives a guide post 1242P coupled to first side-wing mount 121M to control sliding movement of the second rack strip 1242 relative to the first movable head support 121, as suggested in FIG. 11 and shown in FIG. 13. Second rack strip 1242 also includes a set of upwardly extending rack teeth 1242T that mesh with gear teeth 1243T included in motion-transfer gear 1243 as suggested in FIGS. 4 and 13. Second rack strip 1242 is arranged to extend into and slide back and forth in a second strip-receiver channel 1242R formed in first side-wing mount 121M as suggested in FIGS. 11 and 13.

Motion-transfer gear 1243 of linear motion converter 124 includes a wheel 124W, a wheel-cover plate 124P, and a rotation-blocker nut 124N as shown in FIGS. 4, 11, and 13. Wheel 124W is mounted for rotation about axis 1243A and includes the gear teeth 1243T that mesh with rack teeth 1241T of first rack strip 1241 and rack teeth 1242T of second rack strip 1242 to provide means for converting linear movement of first rack strip 1241 in a first direction in strip-receiver channel 1241R formed in second movable head support 122 into linear movement of second rack strip 1242 in an opposite second direction in strip-receiver channel 1242R formed in first movable head support 122 and vice-versa. Rotation-blocker nut 124N is coupled to a front side of wheel-cover plate 124P to locate wheel-cover plate 124P between wheel 124W and rotation-blocker nut 124N as suggested in FIGS. 4 and 13.

Rotation-blocker nut 124N is coupled to motion-converter lock 126 in response to movement of motion-converter lock 126 to the outwardly projected locked position as shown in FIG. 13 to block rotation of wheel 124W about axis 1243A and thereby block relative movement of first and second rack strips 1241, 1242 so that there is no relative movement between the first and second movable head supports 121, 122 of the adjustable-width headrest 12. Alternatively, rotation-blocker nut 124N is decoupled from motion-converter lock 126 in response to movement of motion-converter lock 126 to the inwardly retracted unlocked position to free wheel 124W of motion-transfer gear 1243 to rotate about axis 1243A to use meshing of gear teeth 1243T with rack teeth 1241T, 1242T to cause linear movement of one of rack strip 1241, 1242 relative to the other of rack strip 1241, 1242.

Figure 6:
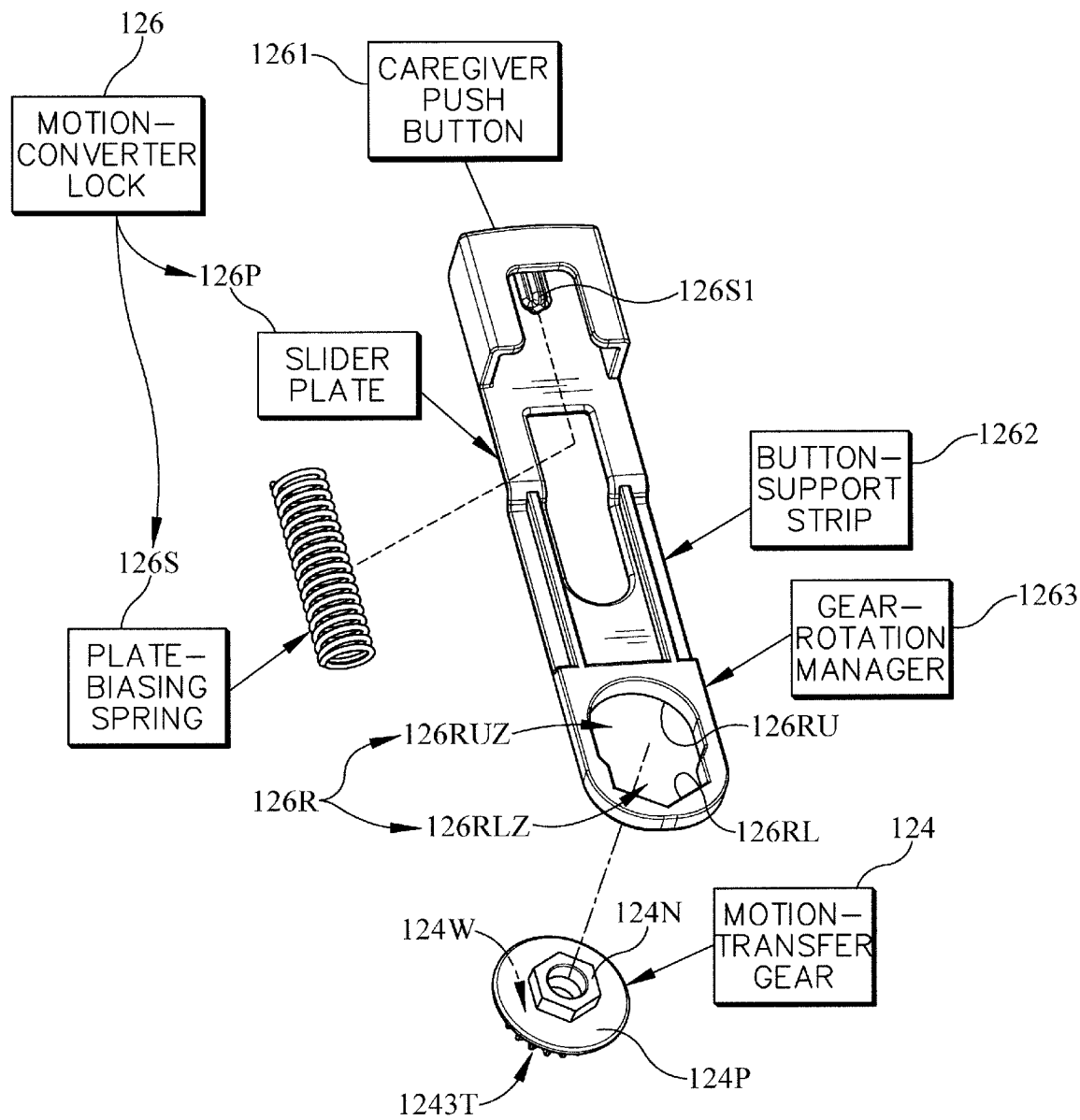
FIG. 6 is an enlarged perspective view of a slider plate that is included in the motion-converter lock and movable relative to the center head support as suggested in FIGS. 7 and 9 and also shows a plate-biasing spring included in the motion-converter lock and used to raise the slider plate relative to the center head support of the adjustable-width headrest to an outwardly projecting locked position relative to the center head support as shown in FIG. 5B and the motion-transfer gear that is included in the linear motion converter and blocked from rotation by a gear-rotation manager that is included in the slider plate.

Motion-converter lock 126 of headrest-width changer 13 includes a slider plate 126P and a plate-biasing spring 126S as suggested in FIGS. 11 and 13. Slider plate 126P is shown in FIG. 6 and includes a caregiver push button 126I, a gear-rotation manager 1263, and a button-support strip 1262 arranged to interconnect caregiver push button 126I and gear-rotation manager 1263. Plate-biasing spring 126S is installed to act between an upper spring mount 126S1 included in motion-converter lock 126 as shown in FIG. 6 and a lower spring mount 126S2 included in center head support 120 as suggested in FIG. 11. Plate-biasing spring 126S is sized and constructed to raise slider plate 126P relative to center head support 120 from an inwardly retracted unlocked position shown in FIGS. 2 and 3 to an outwardly projected locked position shown in FIGS. 1, 5A and 5B.

Gear-rotation manager 1263 of plate 126P of motion-converter lock 126 is formed to include a two-zone nut receiver 126R that is sized to receive rotation-blocker nut 124N therein when motion-converter lock 126 is in the outwardly projected locked position as shown in FIG. 7 and the inwardly retracted unlocked position as shown in FIG. 9. Motion-transfer gear 1243 can rotate freely about axis of rotation 1243A when rotation-blocker nut 124N is located in an upper zone 126RUZ because motion-converter lock 126 is in the inwardly retracted unlocked position. Motion-transfer gear 1243 cannot rotate about axis of rotation 1243A when rotation-blocker nut 124N is located in a lower zone 126RLZ because lock actuator 126 is in the inwardly retracted unlocked position.

Nut receiver 126R is bounded in part by an upper edge 126RU that bounds an upper zone 126RUZ in which rotation-blocker nut 124N can rotate freely about axis of rotation 1243A when motion-converter lock 126 is in the inwardly retracted unlocked position as shown in FIG. 9. In the illustrated embodiment, upper edge 126RU comprises, in sequence, a first straight section, a curved section, and a second straight section as shown in FIG. 6.

Nut receiver 126R is bounded in part by a lower edge 126RL that bounds a lower zone 126RLZ in which rotation-blocker nut 124N is constrained by engagement with gear-rotation manager 1263 of slider plate 126P as shown in FIGS. 7 and 13 so that rotation-blocker nut 124N cannot rotate about axis of rotation 1243A. In the illustrated embodiment, lower edge 126RL comprises four straight sections and each pair of adjacent straight sections cooperates to define an included angle therebetween of about 120 degrees. In use, in the locked position of motion-converter lock 126, each of the four straight sections of lower edge 126RL associated with the nut receiver 126R formed in gear-rotation manager 1263 of slider plate 126P of motion-converter lock 126 is engaged with an exterior side edge of rotation-blocker nut 124N as shown in FIG. 13 to block rotation of rotation-blocker nut 124N (and motion-transfer gear 1243) about axis of rotation 1243A. Thus, first and second rack strips 1241, 1242 cannot move relative to one another as they are engaged to the non-rotatable (e.g. locked) motion-transfer gear 1243 and the first and second movable head supports 121, 122 cannot move relative to one another or to the center head support 120 to widen or narrow the adjustable-width headrest 12.

In illustrative embodiments, adjustable-width headrest 12 is mounted for up-and-down movement on backrest 18 in any suitable manner or it could be mounted in a stationary position on a suitable backrest. Center head support 120 is arranged to contact and support the rear of a seat occupant's head. First and second movable head supports 121, 122 are adjustable inwardly and outwardly in a linear motion in accordance with the present disclosure. Movable head supports 121, 122 effectively interlock with one another as suggested in FIG. 13 owing to sliding engagement of a rack strip cantilevered to one movable head support in a channel formed in the other head support. First and second rack strips 1241, 1242 are connected by a pinion gear 1243.

Motion-transfer gear 1243 will be locked in position so as not to be able to rotate about axis of rotation 1243A by a spring-loaded slider plate 126P. By preventing rotation of motion-transfer gear 1243 about axis of rotation 1243A, the first and second movable head supports 121, 122 will also be locked in place so as to be unable to move relative to center head support 120.

In accordance with the present disclosure, the number of discrete use positions of first and second movable head supports 121, 122 relative to center head support 120 are dependent upon the mating geometries of slider plate 126P and motion-transfer gear 1243, along with the amount of travel of first and second movable head supports 121, 122. An illustrative travel range is three inches (which is one and one half inches on either side). For example, if travel distance remained constant a hexagonal shape would reduce the number of positions into which first and second movable head supports 121, 122 would lock.

Figure 14:
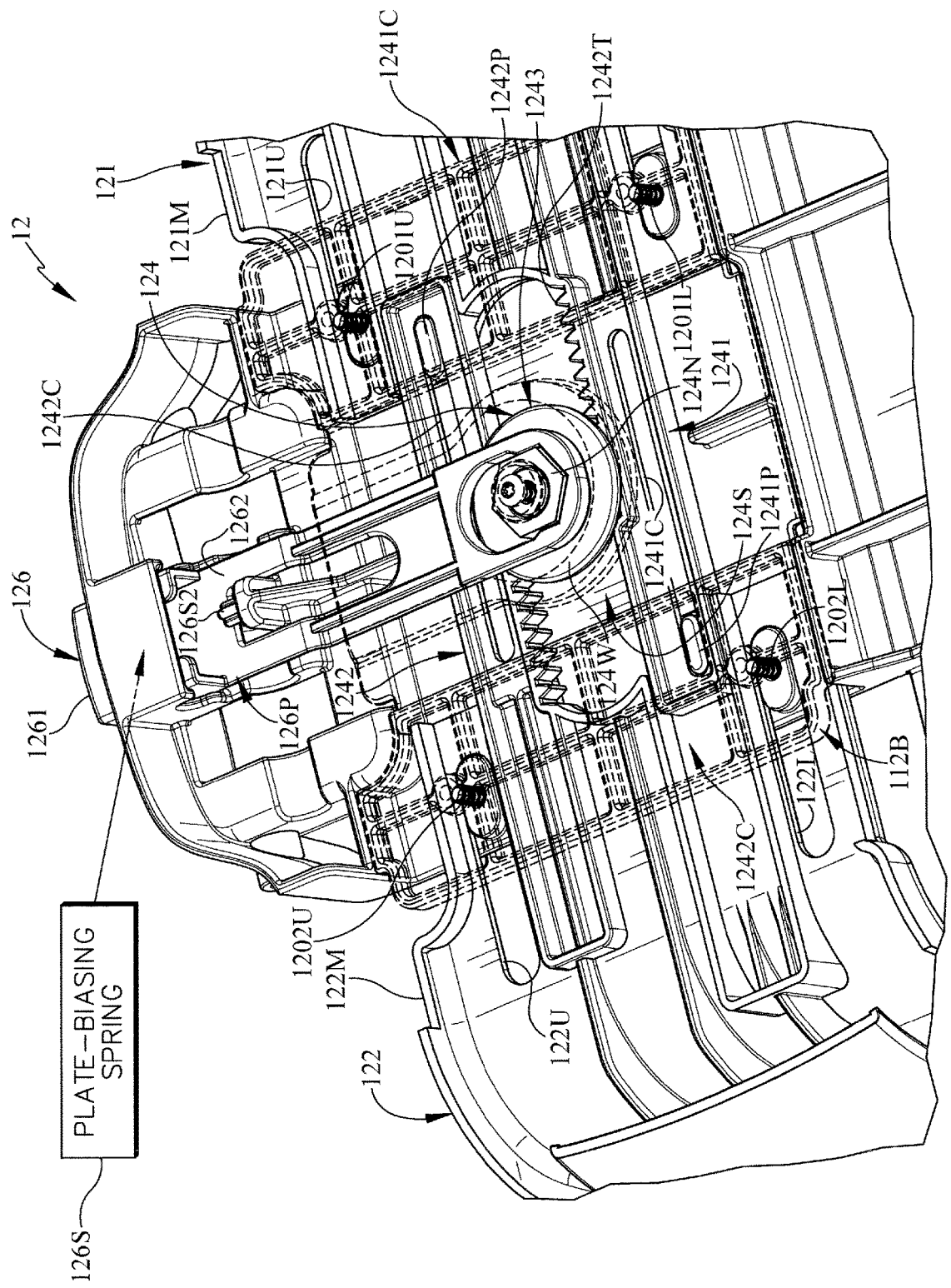
FIG. 14 is a view similar to FIG. 13 with the rear cover panel is shown in a semi-transparent format to show the slider plate in engagement with a hex-shaped rotation-blocker nut included in the motion-transfer gear to block rotation of the motion-transfer gear about its axis of rotation.

A back cover 112B is used to retain all components into the adjustable headrest 12 as suggested in FIGS. 13 and 14. It also serves to guard against exposure of moving components to debris.

Headrest 12 is adjustable in accordance with the present disclosure from side to side to allow headrest 12 to get smaller for a younger smaller child, then expand or open outwardly to allow more room for larger children. The first and second movable head supports 121, 122 adjust the entire depth of headrest 12 and can be moved in and out horizontally to change the width at the point where side wings 121W, 122W meet side-wing mounts 121M, 122M to fit the width of a child's head as the child grows.

The invention claimed is:

1. A child restraint comprising
   a seat bottom and
   a seat back including a backrest arranged to extend upwardly from the seat bottom and a head receiver coupled to the backrest and arranged to lie above the seat bottom,
   wherein the head receiver comprises an adjustable-width headrest and a headrest-width changer, the adjustable-width headrest includes a center head support associated with the backrest, a first movable head support mounted on one side of the center head support for lateral sliding movement relative to the center head support, and a second movable head support mounted on an opposite side of the center head support for lateral sliding movement relative to the center head support, and the headrest-width changer includes converter means for moving the first and second movable head supports away from one another to provide a large head-receiving space between the first and second movable head supports and establish a wide mode of the adjustable-width headrest and toward one another to provide a relatively smaller head-receiving space between the first and second movable head supports in response to movement of one of the movable head supports away from the center head support to establish a narrow mode of the adjustable-width headrest, and wherein the converter means is a linear motion converter that is arranged to lie above the seat bottom and to interconnect the first and second movable head supports to convert lateral movement of the first movable head support in a first direction relative to the backrest automatically into lateral motion of the second movable head support in an opposite second direction relative to the backrest and the linear motion converter includes a first rack strip coupled to the first movable head support to move therewith, a second rack strip coupled to the second movable head support to move therewith, and a motion-transfer gear arranged to lie between the first and second rack strips and include gear teeth that engage and mesh with rack teeth included in each of the first and second rack strips.

2. The child restraint of claim 1, wherein the linear motion converter is located in a space provided between the backrest and the center head support.

3. The child restraint of claim 1, wherein the first rack strip is cantilevered to the first movable head support and arranged to extend into and slide back and forth in a first strip-receiver channel formed in the second movable head support during movement of the first and second movable head supports toward and away from one another and the second rack strip is cantilevered to the second movable head support and arranged to extend into and slide back and forth in a second strip-receiver channel formed in the first movable head support.

4. The child restraint of claim 3, wherein the rack teeth of the first movable head support are arranged to face toward the rack teeth of the second movable head support and the motion-transfer gear is arranged to rotate about an axis that is perpendicular to the backrest in response to lateral motion of one of the movable head supports to cause lateral motion of the other of the movable head supports.

5. The child restraint of claim 4, wherein the first movable head support includes a first side-wing mount coupled at an inboard end to the center head support for lateral sliding movement relative to the center head support and a first side wing coupled at an opposite outboard end of the first side-wing mount for movement relative to the center head support, the first rack strip is cantilevered to the inboard end of the first side-wing mount, the second movable head support includes a second side-wing mount coupled at an inboard end to the center head support for lateral sliding movement relative to the center head support and a second side wing coupled at an opposite outboard end of the second side-wing mount for movement relative to the center head support, the second rack strip is cantilevered to the inboard end of the second side-wing mount, and the first and second side wings are arranged to lie in spaced-apart and opposed relation to one another to define the head-receiving space therebetween.

6. The child restraint of claim 5, wherein the first side-wing mount of the first movable head support is formed to include upper and lower guide slots and the center head support includes a first guide pin that is arranged to extend into the upper guide slot and a second guide pin that is arranged to extend into the lower guide slot and cooperate with the first guide pin to control sliding movement of the first movable head support relative to the center head support.

7. The child restraint of claim 3, wherein the first rack strip is formed to include an elongated channel that receives a guide post included in the second movable head support and located in the first strip-receiver channel to control sliding movement of the first rack strip relative to the second movable head support.

8. The child restraint of claim 7, wherein the first movable head support is formed to include upper and lower guide slots and the center head support includes a first guide pin that is arranged to extend into the upper guide slot and a second guide pin that is arranged to extend into the lower guide slot and cooperate with the first guide pin to control sliding movement of the first movable head support relative to the center head support.

9. The child restraint of claim 1, wherein the headrest-width changer further includes a motion-converter lock that is mounted on the center head support for movement between a locked position engaging the motion-transfer gear to block rotation of the motion-transfer gear about an axis of rotation and an unlocked position disengaging the motion-transfer gear to free the motion-transfer gear to rotate about the axis of rotation to cause lateral movement of one of the rack strips in response to lateral movement of another of the rack strips owing to engagement of the gear and rack teeth to allow a caregiver to widen or narrow the adjustable-width headrest by moving one of the movable head supports relative to the center head support.

10. The child restraint of claim 9, wherein the motion-converter lock includes a slider plate mounted for up-and-down sliding movement relative to the center head support to engage the motion-transfer gear in the locked position of the motion-converter lock and to disengage the motion-transfer gear in the unlocked position of the motion-converter lock.

11. The child restraint of claim 10, wherein the motion-converter lock also includes a plate-biasing spring arranged to act between the slider plate and the center head support normally and yieldably to urge the motion converter lock to the locked position.

12. The child restraint of claim 10, wherein the slider plate includes a caregiver push button, a gear-rotation manager, and a button-support strip arranged to interconnect the caregiver push button and the gear-rotation manager.

13. The child restraint of claim 12, wherein the motion-conversion lock further includes spring means for yieldably urging the slider plate to move upwardly away from the seat bottom to cause the caregiver push button to project upwardly through an opening to expose the caregiver push button to the caregiver and wherein the motion-transfer gear further includes a rotation-blocker nut that rotates about the axis of rotation during rotation of the motion-transfer gear about the axis of rotation and the gear-rotation manager is formed to include a two-zone nut receiver that is sized to receive the rotation-blocker nut therein when the motion-converter lock is in the locked position and the unlocked position, the two-zone nut receiver includes an upper zone that receives the rotation-blocker nut when the motion-converter lock is in the unlocked position and is sized to allow free rotation of the rotation-blocker nut in the upper zone and free rotation of the motion-transfer gear about the axis of rotation to allow relative movement of the first and second movable head supports and widening or narrowing of the adjustable-width headrest and the two-zone nut receiver also includes a lower zone that lies between the upper zone and the seat bottom and receives the rotation-blocker nut when the motion-converter lock is in the locked position and is sized to engage the rotation-blocker nut to block rotation of the motion-transfer gear about the axis of rotation to block relative movement of the first and second movable head supports and widening or narrowing of the adjustable-width headrest.

14. A child restraint comprising
a seat bottom and
a seat back including a backrest arranged to extend upwardly from the seat bottom and a head receiver coupled to the backrest and arranged to lie above the seat bottom,
wherein the head receiver comprises an adjustable-width headrest and a headrest-width changer, the adjustable-width headrest includes a center head support associated with the backrest, a first movable head support mounted on one side of the center head support for lateral sliding movement relative to the center head support, and a second movable head support mounted on an opposite side of the center head support for lateral sliding movement relative to the center head support, and the headrest-width changer includes converter means for moving the first and second movable head supports away from one another to provide a large head-receiving space between the first and second movable head supports and establish a wide mode of the adjustable-width headrest and toward one another to provide a relatively smaller head-receiving space between the first and second movable head supports in response to movement of one of the movable head supports away from the center head support to establish a narrow mode of the adjustable-width headrest,
wherein the headrest-width changer includes a linear motion converter and a motion-converter lock,
wherein the linear motion converter comprises a first rack strip cantilevered to the first movable head support and arranged to extend toward the second movable head support and a second rack strip cantilevered to the second movable head support and arranged to extend away from the second movable head support, the second rack strip is arranged to lie in spaced-apart parallel relation to the first rack strip to define a gear-receiving space therebetween, the linear motion converter also includes a motion-transfer gear that is arranged to extend into the gear-receiving space to engage and mesh with teeth included in each of the first and second rack strips, the motion-transfer gear rotates about an axis of rotation to convert linear motion of one of the rack strips automatically into linear motion of the other of the rack strips so that movement of one of the movable head supports relative to the center head support results in movement of the other of the head supports relative to the center head support to widen or narrow the adjustable-width headrest, and
wherein the motion-converter lock interacts with the motion-transfer gear of the linear motion converter and can be used by a caregiver to block any mode change of the adjustable-width headrest between narrow and wide modes, the motion-converter lock is mounted on the center head support for up-and-down movement between a locked position in which rotation of the motion-transfer gear about its axis of rotation is blocked so that the adjustable-width headrest cannot be widened or narrowed and an unlocked position in which the motion-transfer gear is free to rotate about its axis of rotation to allow the caregiver to widen or narrow the adjustable-width headrest by moving one of the movable head supports relative to the center head support.

15. A child restraint comprising
a seat bottom and
a seat back including a backrest arranged to extend upwardly from the seat bottom and a head receiver coupled to the backrest and arranged to lie above the seat bottom,
wherein the head receiver comprises an adjustable-width headrest and a headrest-width changer, the adjustable-width headrest includes a center head support associated with the backrest, a first movable head support mounted on one side of the center head support for lateral sliding movement relative to the center head support, and a second movable head support mounted on an opposite side of the center head support for lateral sliding movement relative to the center head support, and the headrest-width changer includes a linear motion converter configured to move the first and second movable head supports away from one another to provide a large head-receiving space between the first and second movable head supports and establish a wide mode of the adjustable-width headrest and toward one another to provide a relatively smaller head-receiving space between the first and second movable head supports in response to movement of one of the movable head supports away from the center head support to establish a narrow mode of the adjustable-width headrest, and
wherein the linear motion converter is arranged to lie above the seat bottom and to interconnect the first and second movable head supports to convert lateral movement of the first movable head support in a first direction relative to the backrest automatically into lateral motion of the second movable head support in an opposite second direction relative to the backrest and the linear motion converter includes a first rack strip coupled to the first movable head support to move therewith, a second rack strip coupled to the second movable head support to move therewith, and a motion-transfer gear arranged to lie between the first and second rack strips and include gear teeth that engage and mesh with rack teeth included in each of the first and second rack strips.

16. The child restraint of claim 15, wherein the linear motion converter is located in a space provided between the backrest and the center head support.

17. The child restraint of claim 15, wherein the first rack strip is cantilevered to the first movable head support and arranged to extend into and slide back and forth in a first strip-receiver channel formed in the second movable head support during movement of the first and second movable head supports toward and away from one another and the second rack strip is cantilevered to the second movable head support and arranged to extend into and slide back and forth in a second strip-receiver channel formed in the first movable head support.

18. The child restraint of claim 17, wherein the rack teeth of the first movable head support are arranged to face toward the rack teeth of the second movable head support and the motion-transfer gear is arranged to rotate about an axis that is perpendicular to the backrest in response to lateral motion of one of the movable head supports to cause lateral motion of the other of the movable head supports.

19. The child restraint of claim 17, wherein the first rack strip is formed to include an elongated channel that receives a guide post included in the second movable head support and located in the first strip-receiver channel to control sliding movement of the first rack strip relative to the second movable head support.

20. The child restraint of claim 15, wherein the headrest-width changer further includes a motion-converter lock that is mounted on the center head support for movement between a locked position engaging the motion-transfer gear to block rotation of the motion-transfer gear about an axis of rotation and an unlocked position disengaging the motion-transfer gear to free the motion-transfer gear to rotate about the axis of rotation to cause lateral movement of one of the rack strips in response to lateral movement of another of the rack strips owing to engagement of the gear and rack teeth to allow a caregiver to widen or narrow the adjustable-width headrest by moving one of the movable head supports relative to the center head support.

* * * * *